May 3, 1955 A. NETREBA 2,707,428
FOOD BOILING APPARATUS
Filed Sept. 18, 1951 2 Sheets-Sheet 2
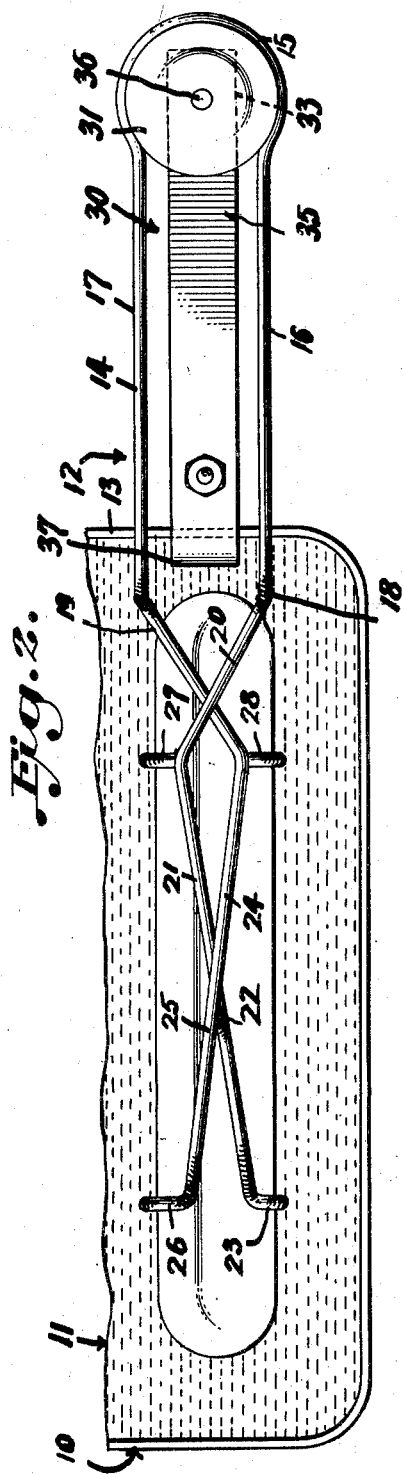
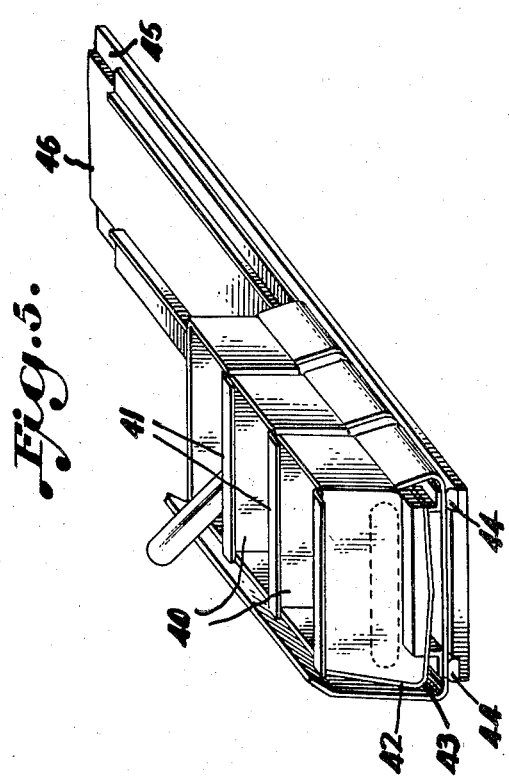
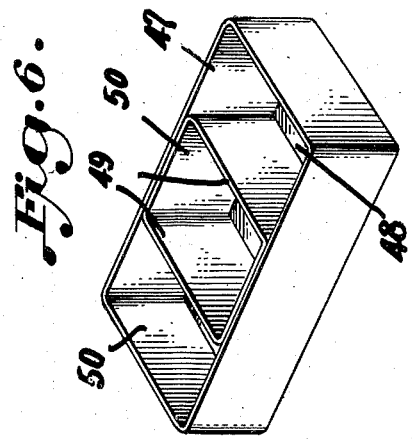
INVENTOR
Alfred Netreba,
BY
ATTORNEY United States Patent Office 2,707,428
Patented May 3, 1955

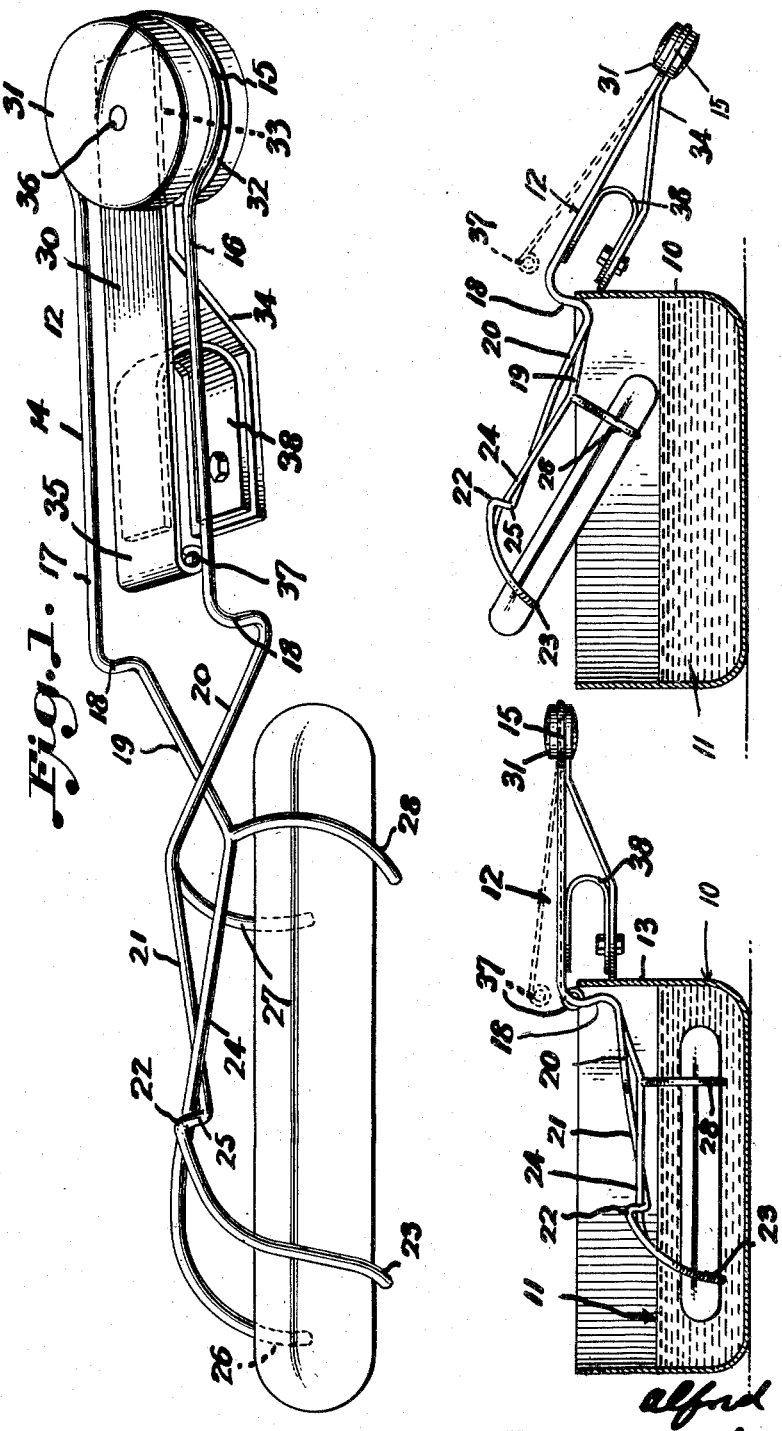

2,707,428

FOOD BOILING APPARATUS

Alfred Netreba, New York, N. Y.

Application September 18, 1951, Serial No. 247,035

5 Claims. (Cl. 99—334)

The present invention relates to means for cooking edible products in fat, oil or boiling water and more particularly has reference to a cooking appliance for use with food products of elongated substantially cylindrical shape and being of sufficient rigidity to maintain their shape. While the appliance is especially efficacious for boiling "frankfurters" and the description is primarily directed thereto, it is to be understood that the inventive concept is of broader scope and the term "sausage" employed in the specification is applicable to all food products possessing the physical characteristics mentioned above.

An important object of the invention is to provide a unit for cooking food products of the general character stated which may be employed in the home or in restaurants which is relatively simple in structural detail, positive and efficient in operation, and which is capable of being easily and inexpensively manufactured.

Yet a further object of the present invention is to provide a cooking appliance of the character set forth having means associated therewith for automatically removing the food product from the cooking liquid when the cooking cycle has been completed.

And still another object of my invention is to provide a cooking unit wherein a device for holding the food product in the liquid during the cooking process includes a heat sensitive element adapted to move the device to a position where the product is out of the liquid when the cooking is completed.

Another object of the invention is to provide a holding device for the food product including resilient jawlike members cooperative to grasp and hold the edible commodity firmly for the cooking step yet capable of being manipulated quickly to release the same for serving purposes.

With the foregoing and other advantageous objects in view, the invention consists in the details of construction, and in the arrangement and combination of parts to be hereinafter more fully set forth and claimed.

In describing the invention in detail, reference will be had to the accompanying drawings forming part of this application, wherein like reference characters denote corresponding parts in the several views, and in which:

Figure 1 is a view in perspective of the holding device with the food product being gripped by the jawlike members.

Figure 2 is a plan view showing the holding device in operative position on a cooking vessel with the food product in the jaw-like members.

Figure 3 is a view in side elevation and partly in cross section of the holding device attached to the cooking vessel wall, with the parts in the positions assumed during the cooking cycle.

Figure 4 is a view similar to Figure 3 depicting the position of the parts after the cooking operation has been completed.

Figure 5 is a view in perspective illustrating one type of cooking vessel and;

Figure 6 is another view in perspective of a modified type.

Generally stated, the invention includes, a holding device for the food product adapted to be supported by the wall of a vessel containing a cooking liquid to maintain the food product immersed therein of swinging movement upon the vessel wall for raising the food product out of the liquid, and a thermostat operatively connected to the latter to permit the holding device to swing by gravity when the cooking cycle has been completed to remove the product from the cooking liquid and maintain it in the path of the aromatic vapors emanating from the liquid until the holding device is detached from the wall of the vessel.

Referring to Figures 2 and 3, a cooking vessel of suitable type is denoted 10, a cooking liquid 11 and holding device 12 is shown supported by vessel wall 13.

The holding device 12 comprises an elongated frame formed of a length of resilient wire 14 which is looped at one end to form a bight 15 from which extends parallel leg portions 16, 17. Each leg portion is bent downwardly as at 18 to provide a pair of spaced stops and portion 14 is then bent upwardly and inwardly as shown at 19 while the leg portion 16 is bent upwardly and inwardly as indicated at 20, the member 20 passing above the member 19 as illustrated in Figures 1 and 2. The member 20 extends a short distance beyond the cross over point and then is provided with an inwardly extending section 21 having an upward bend 22 intermediate the length thereof, the section 21 terminating in a gripping jaw 23 disposed at an angle to the section 21.

The member 19 likewise projects beyond the cross over point of the members 19 and 20 and has an inwardly extending section 24 which frictionally engages the bend 22 as denoted at 25 and the free end of the section is provided with a gripping jaw 26 similar to the jaw 23, the jaws 23 and 26 being diametrically opposed.

As perhaps best shown in Figure 2, the sections 21 and 24 are provided with jaws 27 and 28 respectively at the point of merger of the sections with the members 20 and 19, the jaws 27 and 28 being disposed in parallelism to the jaws 26 and 23. It will be appreciated that if pressure is applied to the leg portions 16 and 17, the jaws 27 and 28 will be opened by virtue of the cross over of the members 19 and 20 and the jaws 23 and 26 will be opened or spread apart the same distance due to the fulcrum effect of the upward bend 22 and the area 25 of the section 24. The jaws 23, 26, 27 and 28 constitute what may be termed the four corners of a rectangle thus insuring a firm gripping action on the food product when the pressure is relieved on the leg portions 16 and 17 to allow the jaws to engage the same automatically because of the resiliency of the holding device.

As previously mentioned, the holding device 12 includes a heat sensitive element for moving the food product out of the cook-liquid when the product has been cooked and such element is shown generally at 30. The heat sensitive element projects from an annular member or knob or weight 31 of a suitable heat insulating material and the periphery of the knob is formed with a continuous groove 32 adapted to receive the bight portion 15 of the wire length 14. The knob is provided with a rectangular bore or recess 33 therein and one end of a cantilever member 34 is lodged in the recess 33. A flexible metal latch strip 35 has one of its ends also mounted in recess above the cantilever member, the respective members being separated by a lamina of heat insulating material and a securing device 36, such as a pin affixes the member 34 and the strip 35 to the knob 31.

The free end of the strip 35 terminates in a bead 37 which constitutes a latch and is adapted to frictionally engage over the rim of the wall 13 of the vessel 10 while the complemental end of the cantilever member 34 contacts the outer face of the wall at a point below the open end of the vessel. The frame is thus normally maintained with its inner end depressed to immerse the food product held thereby in the liquid in the receptacle, as shown in Fig. 3.

A bi-metal thermostatic strip 38 of conventional type is conveniently attached to the cantilever member and the flexible strip 35, preferably by means of a detachable unit. The weight of the outer end of the elongated frame is sufficient, when released by latch bead 37, to overbalance the inner end thereof including the food product supported by the gripper arms.

While the operation of the invention is thought to be apparent from the foregoing description, it may be briefly summarized as follows:

After the holding device has been manipulated to grasp the food product in the jaws 23, 26, 27 and 28, the holding device jaws and product are lowered into the liquid 11. The bead 37 is then engaged with the upper edge of the wall 13 and the end of the cantilever member 34 is in facial contact with the wall below the upper edge. This arrangement means that the food product will be firmly supported by the holding device in the cooking liquid as illustrated in Figure 3. When the heat emanating from the vessel wall is sufficient to expand the bi-metal strip 38, the flexible strip 35 will be moved upwardly whereupon the bead or latch 37 is disengaged from the upper end of the vessel wall and the outer end of the holding device, released to the influence of the greater weight of the outer end of the frame, will swing downwardly to the position shown in Figure 4, thus moving the food product out of the liquid but maintaining it in the path of the warm aromatic vapors rising in the vessel. The food product is kept in this position until time for serving and by squeezing the leg portions 14 and 16, the product is released from the jaws for deposit on a plate or insertion in a roll or the like. The stops 18 of the frame will engage with the inner walls of the receptacle to limit the downward movement of the outer end of the frame when the food product has moved out of the cooking liquid.

Hence it can be seen that I have provided a simple, efficient holding unit for use in cooking food stuffs of the character mentioned which not only serves to support the food item in the cooking liquid but also embodies means to move the food stuff automatically out of the liquid when the item is cooked. The unit additionally insures sanitary handling of the food product since it is unnecessary to touch the product with the hands by reason of the gripping jaws and the mode of operating the jaws to the open and closed positions.

The foregoing describes the inventive idea in connection with domestic cooking operations particularly for frankfurter sausages, and the same idea may be effectively employed for larger operations such as are required in restaurants. Figure 5 of the drawings shows a specially constructed cooking vessel embodying three specially made and separate tanks represented generally at 40. These tanks are arranged in close assembly, and each has an end wall with an outwardly turned flange 41 at its upper end to overlie the wall of the next adjacent tank to prevent the accumulation of any foreign matter between tanks. Each tank is provided with an individual heating element indicated at 42 and rests within a cradle 43. Secured in spaced parallel relationship to the underside of each cradle are legs 44 which rest and slide upon trackways 45 at opposite sides of an elongated heat-resistant panel or support 46. It is obvious from this arrangement that a number of tanks 40 may be assembled upon the supporting panel or base 46 in order that individual cooking receptacles may be utilized.

Figure 6 of the drawings shows a further modification of cooking vessel which may be employed in carrying out the invention. This vessel includes upstanding side and end walls 47 rising from a bottom 48, and within which partition walls 49 are arranged to provide separate cooking chambers 50.

I claim:

1. In a device for supporting a food product of substantially cylindrical elongated shape in a vessel having a cooking liquid therein, a body portion comprising a length of resilient wire bent to form a bight and having substantially parallel legs extending forwardly of the bight, the said legs between the ends thereof being bent inwardly respecting each other and provided with a jaw in proximity to the cross over of the legs, the said legs being bent inwardly beyond said jaws and having a fulcrum at said last named cross over point, a jaw carried by the free end of each leg, a heat insulating member supported by the said bight, a resilient strip secured to the said member and extending forwardly therefrom, a bead on the free end of the strip adapted to frictionally engage the vessel to support the body portion thereon with a said food product gripped in the jaws immersed in the cooking liquid, a support attached to the heat insulating member and extending forwardly therefrom below the resilient strip, a heat sensitive element connected to the resilient strip and support active upon being heated by the heat emanating from the vessel to move the bead on the resilient strip away from the vessel whereupon said heat insulated member, resilient strip and support will move the jaws and food product therein above the cooking liquid level, the food product being released from the jaws by applying pressure to the parallel legs thus simultaneously moving the jaws outwardly by reason of the first named cross over point and the fulcrum.

2. A device as defined in and claimed by claim 1 further characterized in that said heat sensitive strip includes a bi-metal element of substantial U-shape, with the legs connected to the resilient strip and to the said support.

3. The combination with a cooking receptacle having a rim, a holding device comprising an elongated frame resting inwardly of its ends upon said rim with its inner end disposed over the interior of the latter, means on said inner end to support a food product, the outer end of said frame being sufficiently heavy to overbalance said inner end and the food product supported thereby, a latch member on said frame engaging the rim of said receptacle to hold the frame with its inner end depressed within the receptacle and with its outer end in elevated position, and a member on said frame operable when heated to a predetermined degree to release said latch from engagement with said receptacle rim, whereby said outer end of the frame will be released to gravity.

4. The combination with a receptacle to contain a supply of cooking liquid, a holding device comprising an elongated frame resting inwardly of its ends upon the rim of said receptacle with its inner end disposed over the interior of the latter, means on said inner end to support a food product, the outer end of said frame being sufficiently heavy to outweigh said inner end and the food product supported thereby, stops depending from said frame and disposed adjacent to the inner wall of said receptacle, a cantilever member on the outer end of said frame to engage the outer wall of said receptacle below the plane of said stops, a thermally operable latch projecting inwardly from said outer frame end to engage over the edge of said rim to hold said frame with its inner end depressed and with the stops aforesaid normally out of contact with said receptacle, whereby upon release of said latch from said rim the outer end of said frame will move downwardly and will be arrested in such movement when said stops engage with said rim.

5. The combination with a cooking receptacle having an upstanding rim, a holding device comprising an elongated frame resting inwardly of its ends upon said rim with its inner end disposed over the interior of the latter, means on said inner end to support a food product, the outer end of said frame being sufficiently heavy to overbalance said inner end and the food product supported thereby, a stop depending from said frame adjacent to the mid-portion thereof and disposed inwardly of said rim, a lever secured at one end to the outer end of said frame and having its free end disposed in substantially the same horizontal plane with said stop and spaced outwardly of said rim, and a thermally operated latch projecting inwardly from the outer end of said frame engaged over the edge of said rim and normally holding said frame with the lever end engaged with the outer wall of said receptacle, said latch responsive at a predetermined temperature to disengage from said rim edge, whereby upon release of said latch from said rim the outer end of said frame will be released to gravity and will be arrested in downward movement by engagement of said stop with the inner wall of said receptacle rim.

References Cited in the file of this patent

UNITED STATES PATENTS

| | | |
|---|---|---|
| 670,296 | Richardson | Mar. 19, 1901 |
| 846,470 | Hermance | Mar. 12, 1907 |
| 1,149,590 | Moe | Aug. 10, 1915 |
| 1,540,628 | Hurxthal et al. | June 2, 1925 |
| 1,623,093 | Chapin et al. | Apr. 5, 1927 |
| 1,945,165 | Smith | Jan. 30, 1934 |
| 1,954,894 | Shenton | Apr. 17, 1934 |
| 2,014,089 | Sabini | Sept. 10, 1935 |
| 2,066,185 | Miller et al. | Dec. 29, 1936 |
| 2,404,130 | Frank | July 16, 1946 |